United States Patent [19]

Keller

[11] Patent Number: 4,796,777
[45] Date of Patent: Jan. 10, 1989

[54] VENTED FUEL TANK CAP AND VALVE ASSEMBLY

[76] Inventor: Russell D. Keller, 149 N. Lotus Beach Dr., Portland, Oreg. 97217

[21] Appl. No.: 138,150

[22] Filed: Dec. 28, 1987

[51] Int. Cl.$^4$ .............................................. B65D 45/00
[52] U.S. Cl. ................................... 220/203; 220/89 B
[58] Field of Search ............... 220/203, 254, 360, 367, 220/DIG. 33, 89 B

[56] References Cited

U.S. PATENT DOCUMENTS

| | | | |
|---|---|---|---|
| 3,610,263 | 10/1971 | Walters | 137/43 |
| 3,757,987 | 9/1973 | Marshall | 220/203 X |
| 3,910,302 | 10/1975 | Sudhir | 137/43 |
| 3,918,606 | 11/1975 | Keller | 220/208 |
| 3,970,098 | 7/1976 | Boswank et al. | 137/39 |
| 3,985,260 | 10/1976 | Evans | 220/203 |
| 4,059,125 | 11/1977 | Sugimura et al. | 220/89 B X |
| 4,091,955 | 5/1978 | Sloan | 220/203 |
| 4,162,021 | 7/1979 | Crute | 220/202 |
| 4,232,796 | 11/1980 | Hudson, Jr. et al. | 220/89 B |
| 4,294,376 | 10/1981 | Keller | 220/DIG. 33 X |
| 4,325,398 | 4/1982 | Green | 137/39 |
| 4,351,350 | 9/1982 | Crute | 137/39 |
| 4,457,325 | 7/1984 | Green | 220/203 X |

Primary Examiner—Steven M. Pollard

[57] ABSTRACT

A vented fuel tank cap and valve assembly is described including a pressure relief valve with a main valve member mounted at a main vent opening through the fuel cap. A fusible metal ring of low melting point is provided in the pressure relief valve to enable such valve to open in the event of fire to prevent an explosion. A float valve may be provided to close a secondary vent passage for venting fuel fumes through the valve stem portion of the main valve member. The float valve includes a tubular cage member attached to such valve stem portion and containing a hollow float member with a cavity opening through the bottom of such float. A metal ball is provided within the cage member beneath the float member to hold the float valve closed when the tank tips to an inverted position and to trap liquid fuel in such cavity so that such fuel flows out of the cavity to open the valve when the tank returns to an upright position to prevent the float valve from sticking closed. An auxiliary seal portion may be provided on the main valve member to increase the tank pressure required to remove the main valve member from the tank after the fusible ring melts so that liquid fuel is not discharged from the tank prematurely.

20 Claims, 2 Drawing Sheets

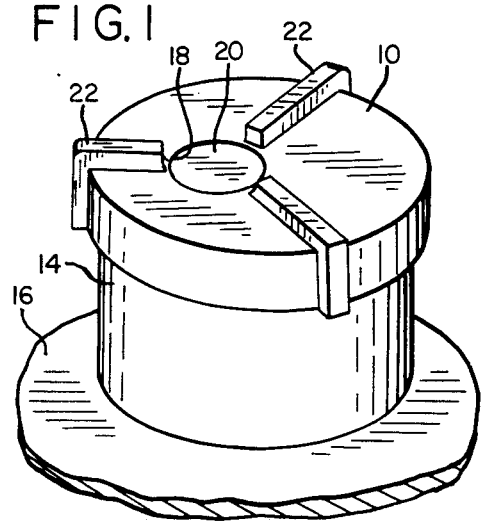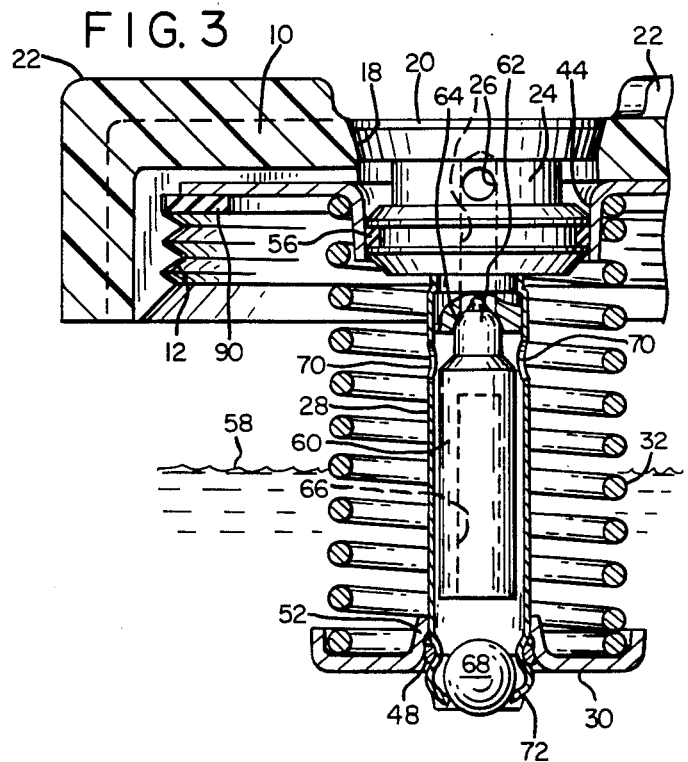

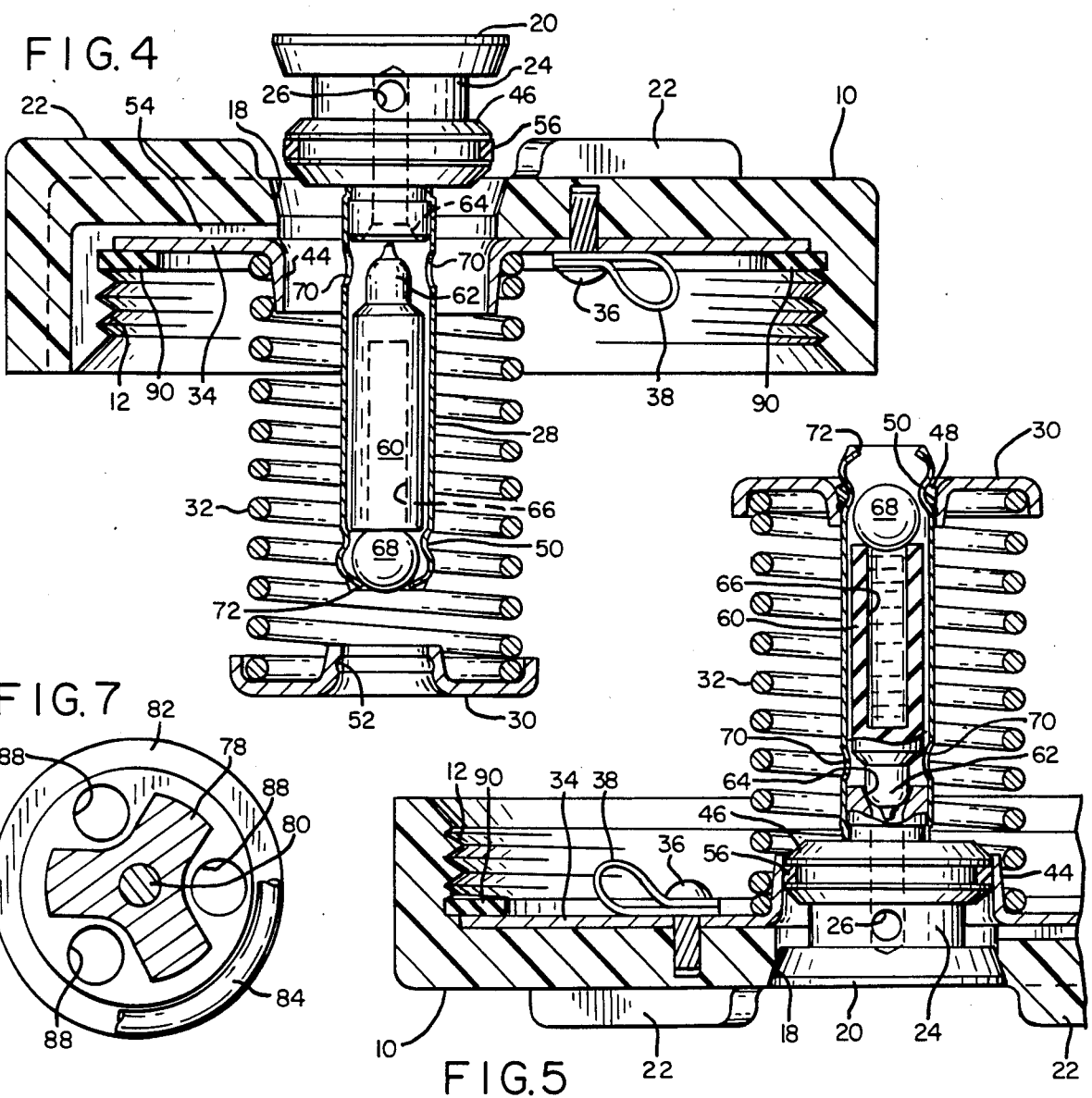
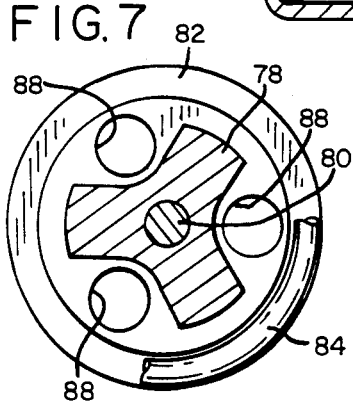
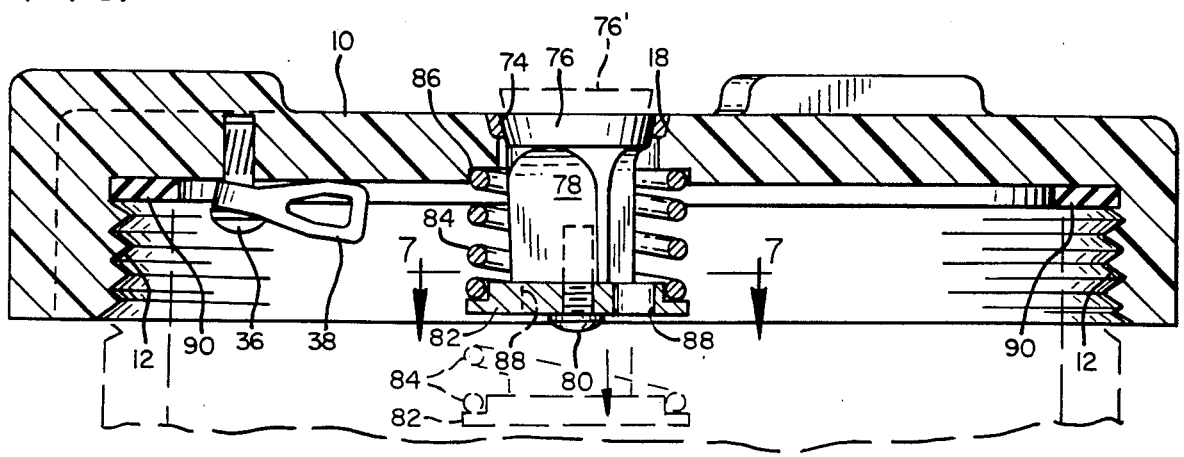

VENTED FUEL TANK CAP AND VALVE ASSEMBLY

BACKGROUND OF THE INVENTION

The subject matter of the present invention relates generally to liquid tank filler cap and valve assembly and, in particular, to a vented fuel tank cap and valve assembly including a pressure relief valve with a main valve member mounted at a main vent opening through such cap which is normally spring-biased closed and which includes a fusible element that melts above a predetermined temperature to cause the valve to open. The fuel tank cap and valve assembly may also include a float valve mounted at a secondary vent passage through the valve stem of the main valve member that is normally open to vent fumes from the tank but which closes to prevent spillage when the liquid fuel raises within the tank such as when a truck with such tank travels rapidly around a corner.

It is known to provide a fuel tank cap and valve assembly including a spring-biased pressure relief valve mounted on such cap as shown in U.S. Pat. No. 3,918,606 of Keller issued Nov. 11, 1975; U.S. Pat. No. 4,294,376 of Keller issued Oct. 13, 1981; and U.S. Pat. No. 4,091,955 of Sloan issued May 30, 1978. In addition, it is known to provide a tank vent with a float valve for closing the vent when the tank is tipped as shown in U.S. Pat. No. 3,970,098 of Boswank, et al., issued July 20, 1976, and U.S. Pat. No. 4,325,398 of Green issued Apr. 20, 1982. These patents also show that it is old to provide a spherical steel ball as a weight member for closing the float valve in an inverted position of the tank so that it also functions as a gravity valve. They also show that it is old to provide vents with plugs or cover assemblies having fusible elements which melt above a predetermined temperature to open the vent.

It has previously been proposed to provide a fuel tank cap with both a pressure-relief valve and a gravity-actuated valve as shown in U.S. Pat. No. 3,985,260 of Evans issued Oct. 12, 1976, and U.S. Pat. No. 4,162,021 of Crute issued July 24, 1979. Also, it is old to provide a fuel tank vent with a float valve separate from the tank cap including a hollow float member with a bottom opening cavity as shown in U.S. Pat. No. 3,910,302 of Sudhir issued Oct. 7, 1975. In addition, it has also been proposed to provide a discharge prevention valve in the fuel tank filler neck itself, as shown in U.S. Pat. No. 3,610,263 of Walters issued Oct. 5, 1971. Finally, it has been previously suggested to provide a valve assembly for a fuel tank including a vent passage with both a rollover float valve and a pressure-relief valve which are both spring operated as shown in U.S. Pat. No. 4,351,350 of Crute issued Sept. 28, 1982.

These prior patented devices have extremely complicated valve assemblies and are not of a simple, trouble-free, compact construction like that of the present invention which is suitable for mounting on a fuel tank cap. In addition, such prior fuel tank cap and valve assembly apparatus are not provided with a fusible element as part of the valve assembly which melts above a predetermined pressure to open the valve in the event of a fire in the manner of the present invention. Furthermore, none of such fuel tank cap and valve assembly apparatus employs a pressure-relief valve for a main vent opening in the tank cap having an auxiliary seal means provided on the main valve member at a position spaced inwardly of the main valve seal for maintaining the valve closed, even after the fusible length melts, until the pressure within the tanks exceeds a predetermined minimum amount to open both of such seals. Finally, none of these prior patents shows such a fuel tank cap and valve assembly having a float valve mounted within a valve cage attached to the valve stem of the pressure-relief valve for closing a secondary vent passage through such valve stem like the invention here. Also, none of such patents shows the use of a hollow float valve member whose bottom opening is engaged by a metal ball in an inverted position to trap liquid within the cavity so that when the fuel tank is returned to a normal, upright position such liquid fuel flows out of the hollow float, causing it to open and preventing the valve from sticking, in the manner of the present invention.

SUMMARY OF THE INVENTION

It is, therefore, one object of the present invention to provide an improved liquid tank cap and valve assembly of simple and compact construction which has a safe, trouble-free operation.

Another object is to provide a fuel tank cap and valve assembly including a main valve which is normally held in a closed position by a resilient closure means which allows the valve to open when the pressure within the tank exceeds a predetermined pressure and which includes a fusible element for releasing the main valve member and enabling it to open when such fusible element melts.

A further object of the invention is to provide such a fuel cap and valve assembly which is also provided with a secondary vent passage for venting fuel vapors from the tank and a float valve for closing such vent passage when liquid fuel rises in the tank to prevent spillage of the liquid fuel.

An additional object of the invention is to provide such a gas cap and vent assembly in which the float valve is supported on the main valve stem member and the vent passage extends through such valve stem member to provide a more compact valve assembly.

Still another object of the invention is to provide such a fuel cap and valve assembly in which the float valve member is hollow and is provided with a cavity having a bottom opening which is covered by a weighted ball for trapping liquid fuel within the float cavity so that when the tank is returned from a tipped or inverted position to its upright position, such liquid fuel flows out of the cavity and causes the float valve to move down into an open position of the float valve, thereby preventing such valve from sticking closed.

A still further object of the invention is to provide such a fuel cap and valve assembly apparatus in which the main valve member is provided with an auxiliary seal which is spaced inward from the main seal of such member in the main vent opening of the cap body and prevents the main valve from opening after the fusible length melts, until the pressure within the tank exceeds a predetermined minimum pressure.

A still additional object of the invention is to provide such a fuel cap and valve assembly apparatus in which the fuel cap is made of fiberglass-reinforced plastic material to prevent it from sticking to the threads of the fuel tank filler tube during adverse conditions such as freezing temperatures.

BRIEF DESCRIPTION OF DRAWINGS

Other objects and advantages of the present invention will be apparent from the following detailed description of preferred embodiments of the invention and from the attached drawings, of which:

FIG. 1 is an oblique elevation view of one embodiment of the tank cap and valve assembly apparatus shown attached to the fuel filler tube of a fuel tank;

FIG. 2 is an enlarged vertical section view taken along the line 2—2 of FIG. 1 with the pressure relief valve closed and the float valve shown in an open position;

FIG. 3 is a vertical section view similar to that of FIG. 2 but showing the float valve in a closed position;

FIG. 4 is a vertical section view similar to FIG. 2 but with the pressure relief valve open showing the position of the main valve member after the fusible element melts and such valve member is caused to move outwardly by excessive pressure within the fuel tank;

FIG. 5 is a vertical section view similar to FIG. 3 but showing the float valve held in a closed position by the metal weight ball to provide a gravity-actuated valve when the tank is in an inverted position;

FIG. 6 is a vertical section view of another embodiment of the fuel tank cap and valve assembly of the present invention which employs a pressure-relief valve including a fusible valve assembly element but no float valve; and FIG. 7 is an enlarged horizontal section view taken along the line 7—7 of FIG. 6.

DESCRIPTION OF PREFERRED EMBODIMENTS

As shown in FIGS. 1 and 2, the preferred embodiment of the fuel tank cap and valve assembly of the present invention includes a cap member 10 which may be of aluminum but is preferably made of a fiberglass-reinforced plastic material such as polypropylene, nylon, or other suitable plastic which does not stick to metal threads 12 of a filler tube 14 of aluminum or steel extending out of the top of a liquid container 16 such as a fuel tank. The fuel cap member 10 is provided with a main vent opening 18 in the top of the cap which is closed by a main valve member 20 forming part of a pressure relief valve. The cap member 10 is provided with three external ridges 22 on its top surface which are spaced approximately 120 degrees apart about the circular periphery of the cap to provide finger gripping elements for tightening and loosening the cap.

As shown in FIG. 2, the main valve member 20 is of a frustro-conical shape whose outer edge seals a mating conical surface surrounding the main vent opening 18 through the cap member 10 in the normally-closed position of the pressure relief valve shown in FIG. 2. The main valve member 20 includes a valve stem portion 24 of reduced diameter through which a secondary vent passage 26 is formed by drilling two intersecting passages at right angles to each other, the horizontal passage extending completely through the valve stem to provide two outlets. The bottom of the valve stem 24 is attached by crimping to the top of a metal tubular valve cage member 28 whose bottom end is secured to a lower spring retainer plate 30 of a cup shape. A coil spring 32 which functions as the main valve closure spring is held between the lower retainer plate 30 and an upper spring retainer plate 34 which is secured to the underneath side of the cap member 10 by a screw 36.

The screw 36 also secures such cap to a fastener 38 attached to one end of a flexible connector 40 such as a brass chain whose other end is attached to an anchor ring 42 fixed within the tank to prevent the fuel cap member 10 from being lost once it is removed from the tank filler tube.

The upper retainer plate 34 is provided with a downwardly-projecting annular valve seat portion 44 which functions as an auxiliary valve seat for engagement with an auxiliary valve seal portion 46 provided on the valve stem 24. The auxiliary seal 46 includes a rubber O-ring 56 which forms a fluid-tight seal between the auxiliary valve seat member 44 and the auxiliary valve portion 46. Thus, under normal operating conditions, the valve spring 32 urges the lower retainer plate 30 and the main valve member 20, 24, and 28 downward into a closed position to close the pressure relief valve, as shown in FIG. 2. When the fluid pressure within the fuel tank exceeds a predetermined pressure in the range of 6.5 to 8.5 psi, sufficient to overcome the force of the valve spring 32, the main valve member 20 is caused to be moved upward into the raised position 20', shown in FIG. 2 by dashed lines, thereby venting fuel vapor from the tank to prevent an explosion.

A fusible metal ring valve assembly element 48 is clamped between the lower retainer plate 30 and the bottom end of the tubular cage member 28. The bottom end of the tubular member 28 is provided with an annular groove 50 into which the fusible ring 48 fits so that it is clamped between such tubular member and the upwardly-projecting inner flange 52 on the lower retainer plate 30. In the event of fire, the fusible ring 48 melts after the temperature within the tank exceeds the melting temperature of such ring which may be on the order of approximately 190 degrees Fahrenheit. When this happens and after the pressure within the tank exceeds a predetermined minimum pressure on the order of about 10 psi, the main vent member 20 and the valve assembly attached thereto, including the tubular cage member 28 and the float valve contained therein hereafter described, all move upward and out of the cap as shown in FIG. 4. This causes a rapid release in the pressure within the tank and prevents explosion in the case of fire. It should be noted that the auxiliary seal between auxiliary valve seat member 44 and the auxiliary valve portion 46 of the main valve stem 24 retain the main valve in the closed position of FIG. 2, even after the fusible ring 48 melts until the pressure within the tank builds to a predetermined minimum amount of about 10 psi because of the increased friction due to thermal expansion. At normal temperature, the pressure-relief valve provided by the main valve member 20 and the valve spring 32 allow venting of the fuel vapor from the tank through the main valve opening 18 when the pressure within the tank exceeds approximately 6.5 to 8.5 psi. Also, it should be noted that at lower pressures fuel vapor within the tank is slowly vented through the secondary vent passage 26 out through a passage 54 provided between the upper retainer plate 34 and the cap member 10 and through the threads of the fuel cap body 10, as shown in FIG. 2.

As shown in FIG. 3, when the liquid fuel level 58 within the fuel tank rises above the lower end of the cage member 22, it causes a hollow float member 60, held captive within the cage 28, to rise until it closes the inlet opening at the bottom of the secondary vent passage 26. The float 60 may be made of polypropylene or other suitable plastic material of a lower density than the liquid fuel so that it floats in such fuel. The float valve closes the secondary vent passage 26 to prevent liquid fuel from being discharged from the tank through such passage such as when in the event that the tank tips from its normally vertical position in an accident or when the fuel rises by centrifugal force, such as when the truck having such fuel tank mounted thereon travels rapidly about a corner. The float member 60 is provided with a hemispherical protrusion 62 on its upper end which engages a conical valve seat opening 64 at the inlet of the secondary vent passage 26 at the lower end of the valve stem member 24. It should be noted that the float member 60 is provided with an internal cavity 66 having an access opening which opens through the bottom of the float member. When the fuel tank is moved into an inverted position shown in FIG. 2, or past an approximately 90-degree angle of inclination, a weighted ball 68 of metal, such as stainless steel, held within the cage member 28 is caused to move into engagement with the bottom of the float member 60. This causes the float valve to also act as a gravity valve and to remain in a closed position. Also, it should be noted that a pair of vent openings 70 are provided in the sides of the tubular cage member 28 to allow fuel vapors to pass therethrough and to exit via the secondary vent passage 26 in the normally-open float valve position of FIG. 2.

As shown in FIG. 5, in the inverted position of the fuel tank, the metal ball 68 closes the opening in the cavity 66 within the float 60, thereby trapping liquid fuel within such cavity. As a result, when the fuel tank is returned to its normal, upright position and the metal ball 68 falls downward, away from the opening, liquid fuel then flows out of the cavity 66 thereby causing the float 60 to release from the valve seat 64 and to move downward into the position shown in FIG. 2. This prevents the float valve from sticking in the closed position. It should be noted that the bottom end of the cage tube 28 is crimped inwardly to form an internal flange 72 which holds the metal ball 68 within the cage. Also, it should be noted that the combination of the metal ball 68 and the float member 60 together with valve seat 64 function as a gravity-actuated valve in the inverted position shown in FIG. 5 and when the tank is tipped greater than a predetermined angle of inclination such as 90 degrees.

Another embodiment of the fuel cap and valve assembly of the present invention is shown in FIGS. 6 and 7. Some of its parts are similar to those of the other embodiment previously described and are given the same reference numbers so they will not be described. In this embodiment, the fuel tank cap 10 is provided with a main vent opening 18 therethrough, around which is mounted a fusible ring valve assembly element 74 of a conical shape which is engaged by a main valve member 76 of similar shape. A valve stem portion 78 of the main valve member is secured by a screw 80 at its bottom end to a spring retainer plate 82. A coiled spring 84 is provided around the valve stem member 78 with its lower end in engagement with the upper surface of the retainer plate 82 and its upper end in engagement with an annular groove 86 in the underside of the cap member 10 surrounding the vent opening 18. The valve stem portion 78 is of a trilobular shape with three lobe portions. Three circular openings 88 are provided through the spring retainer plate 82, each between a different pair of lobes to allow liquid to circulate therethrough.

The main valve member 76 is held in a normally-closed position by the force of the coil spring 84 which engages the retainer plate 82 and urges it, as well as the valve stem member 78 and a valve member 72 in a downward direction, so that the conical outer edge of the main valve member engages the fusible ring 74. When the temperature surrounding the fuel cap 10 exceeds the melting point of the fusible ring 74, which may be approximately 190 degrees Fahrenheit, such ring melts and the main valve member 76 is caused to move downward through the cap opening 18 by the valve spring 84 as shown by the dashed line position of the retainer plate 82 in FIG. 6. This opens the main valve opening 18 and allows fluid pressure within the tank to rapidly equalize to that of the surrounding atmosphere. It should be noted that in this embodiment, the valve member is not expelled out of the tank so it will not be lost in the event of melting of the fusible ring 74. Of course, the main valve member 76 operates as a pressure relief valve and normally opens by raising the main valve member 76 to the raised position 76' for rapidly venting fuel vapor from the tank when the pressure exceeds a predetermined amount on the order of 6.5 to 8.5 psi. A rubber washer 90 may be provided within the cap 10 to provide a gas-tight seal between such cap and the fuel tank filler tube 14. A similar seal washer is also provided in the embodiment of FIG. 2.

It will be obvious to those having ordinary skill in the art that many changes may be made in the above-described details of the preferred embodiments of the present invention without departing from the scope of the invention. Therefore, the scope of the invention should be determined by the following claims.

I claim:

1. Vented tank cap apparatus comprising:
   cap means for closing a liquid fill opening of a liquid container tank, said cap means including a cap member for covering said fill opening and having a main vent opening therethrough;
   valve means for closing said main vent opening, said valve means including a main valve member mounted on said cap member for normally closing said main vent opening in a closed position;
   resilient closure means for resiliently urging said main valve member into said closed position but allowing it to open when the pressure within said tank exceeds a predetermined pressure; and
   fusible means operatively coupled to the main valve member for closing the main vent opening and for releasing said main valve member and enabling it to move from said closed position to an open position when said fusible means melts.

2. Cap apparatus in accordance with claim 1 in which the tank is a fuel tank and the main valve member is provided with a secondary vent opening therethrough which is normally open to vent fuel vapors from the tank.

3. Cap apparatus in accordance with claim 1 in which the main valve member is provided with an auxiliary valve seal means for sealing said valve member to an auxiliary valve seat member attached to said cap member and spaced inwardly from the vent opening toward the interior of the tank, said valve member continuing to close said main vent opening and said auxiliary seal means after said fusible means is melted until the pressure within said tank exceeds a maximum pressure.

4. Cap apparatus in accordance with claim 2 in which the secondary vent opening is closed by a float valve member when the liquid fuel in said tank reaches a predetermined level to prevent liquid fuel from being discharged therethrough.

5. Cap apparatus in accordance with claim 4 in which the float valve member is held within a valve cage extending from said main valve member and is normally spaced from said main valve member to open the secondary vent opening to allow fuel vapors to vent from the tank.

6. Cap apparatus in accordance with claim 5 in which a weight is provided beneath said float valve member and is held within said valve cage to provide a gravity-operated valve which closes the secondary vent opening when said tank is tipped at an angle greater than a predetermined amount.

7. Cap apparatus in accordance with claim 6 in which the float member is provided with a cavity having a float opening in the bottom of said float member which is open when the float valve is closed, and the weight is a metal ball which closes said float opening to trap fuel in said cavity when said tank tips sufficiently from its normal upright position to cause the gravity-operated valve to be closed by said weight, said trapped fuel flowing out of said cavity and causing said float member to move downward to open the float valve when the tank returns to said upright position.

8. Cap apparatus in accordance with claim 1 in which the resilient closure means includes a coil spring having its upper end attached to the cap member and its lower end attached to a retainer member which is secured to said main valve member to resiliently urge the main valve member toward the interior of said tank.

9. Cap apparatus in accordance with claim 1 in which the cap member is made of fiberglass-reinforced plastic material.

10. Cap apparatus in accordance with claim 1 in which the fusible means includes a fusible ring positioned between the main valve member and said main vent opening.

11. Cap apparatus in accordance with claim 7 in which the fusible means includes a fusible ring positioned between said retainer member and said main valve member.

12. Vented fuel tank cap apparatus, comprising:
cap means for closing a fuel filler tube of a fuel tank, said cap means including a cap member for covering a fill opening of the filler tube and having a vent opening through the top of said cap member;
pressure relief valve means for closing said main vent opening and including a main valve member resiliently mounted on said cap member for normally closing said main vent opening and for opening said main vent opening when the pressure within said tank exceeds a predetermined pressure; and
float valve means for closing a secondary vent passage through a valve stem portion of said main valve member, said float valve means including a float member having a cavity therein which opens through the bottom of said float member, said float member being mounted in a cage member on said valve stem portion for closing an inlet opening of said second vent passage when the liquid fuel within said tank raises above a predetermined level and for opening said inlet opening when said fuel is below said predetermined level to vent fumes out of said tank through said secondary vent passage.

13. Cap apparatus in accordance with claim 12 in which the float member is generally cylindrical and said cavity opening of the float member is closed by a weight within said cage member to trap fuel within the cavity when the fuel tank is inverted and being opened by said weight to allow such fuel to flow out of the cavity when the fuel tank is returned to an upright position to prevent the float valve member from sticking in a closed position.

14. Cap apparatus in accordance with claim 13 in which the weight is a weighted ball.

15. Cap apparatus in accordance with claim 14 in which the ball is of metal.

16. Cap apparatus in accordance with claim 12 in which the cage member is a tube attached at one end to the valve stem portion and attached at its other end to a lower retainer plate which retains the lower end of a coiled spring surrounding said cage member and resiliently urging said main valve member closed.

17. Cap apparatus in accordance with claim 16 in which a fusible ring member is clamped between said lower retainer plate and said cage member so that when said fusible ring member melts the cage member and the lower retainer plate are detached to allow said main valve member to open.

18. Cap apparatus in accordance with claim 17 which also includes an upper retainer plate attached to the under side of the cap member to engage the upper end of the coiled spring.

19. Cap apparatus in accordance with claim 18 in which an auxiliary valve seal means is provided on the valve stem portion for sealing the main valve member to an auxiliary valve seat provided on said upper retainer member.

20. Cap apparatus in accordance with claim 19 in which the auxiliary valve seat is formed by a flange portion of said upper retainer plate and the auxiliary valve seal means includes a sealing ring of elastomer material which engages the valve seat.

* * * * *

UNITED STATES PATENT AND TRADEMARK OFFICE
CERTIFICATE OF CORRECTION

PATENT NO. : 4,796,777
DATED : January 10, 1989
INVENTOR(S) : Russell D. Keller It is certified that error appears in the above-identified patent and that said Letters Patent is hereby corrected as shown below:

Column 2, line 2, "tanks" should be --tank--;

Column 5, line 8, after "is" insert --generally cylindrical and--; and

Column 7, line 41, claim 11, change "7" to --8--.

Signed and Sealed this

Thirtieth Day of March, 1993

*Attest:*

STEPHEN G. KUNIN

*Attesting Officer*     *Acting Commissioner of Patents and Trademarks*